US011256383B2

(12) United States Patent
Paley

(10) Patent No.: US 11,256,383 B2
(45) Date of Patent: *Feb. 22, 2022

(54) GRAPHICALLY REPRESENTING CONTENT RELATIONSHIPS ON A SURFACE OF GRAPHICAL OBJECT

(71) Applicant: World Diamonds, LLC, Warren, CT (US)

(72) Inventor: Kate Paley, Warren, CT (US)

(73) Assignee: Word Diamonds LLC, Warren, CT (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/502,564

(22) Filed: Jul. 3, 2019

(65) Prior Publication Data

US 2019/0324624 A1 Oct. 24, 2019

Related U.S. Application Data

(60) Division of application No. 15/185,198, filed on Jun. 17, 2016, now Pat. No. 10,345,990, which is a
(Continued)

(51) Int. Cl.
*G06F 16/00* (2019.01)
*G06F 3/04815* (2022.01)
*G06F 16/81* (2019.01)
*G06F 16/955* (2019.01)
*G06F 3/0481* (2022.01)
(Continued)

(52) U.S. Cl.
CPC ........ *G06F 3/04815* (2013.01); *G06F 3/0481* (2013.01); *G06F 3/0482* (2013.01); *G06F 3/0484* (2013.01); *G06F 16/23* (2019.01); *G06F 16/81* (2019.01); *G06F 16/9558* (2019.01); *G06T 17/20* (2013.01); *G06F 2203/04802* (2013.01)

(58) Field of Classification Search
None
See application file for complete search history.

(56) References Cited

U.S. PATENT DOCUMENTS 4,752,889 A 6/1988 Rappaport et al.
5,546,529 A 8/1996 Bowers et al.
(Continued)

OTHER PUBLICATIONS

"STARLIGHT Information Visulaization Technologies," Introduction, Pacific Northwest National Laboratory, U.S. Department Energy, Richland, Washington, May 2008 (http://starlight.pnl.gov/introduction.stm).

(Continued)

*Primary Examiner* — Bai D Vu
(74) *Attorney, Agent, or Firm* — Venable LLP

(57) ABSTRACT

A collection of data stored in a computer-readable storage medium is provided, and a plurality of portions of the collection are associated with corresponding identifiers that are associated with positions of an object to be rendered. User selections of positions on the surface of the object are received. The portions associated with the user selected position are determined, and the portions are displayed at their respective position on the surface of the object. The selected portions can be displayed as being connected by graphical elements.

8 Claims, 16 Drawing Sheets

Related U.S. Application Data division of application No. 14/242,024, filed on Apr. 1, 2014, now Pat. No. 9,401,045, which is a continuation of application No. 12/572,879, filed on Oct. 2, 2009, now Pat. No. 8,689,143.

(60) Provisional application No. 61/102,663, filed on Oct. 3, 2008.

(51) Int. Cl.
| | | |
|---|---|---|
| *G06F 16/23* | (2019.01) | |
| *G06T 17/20* | (2006.01) | |
| *G06F 3/0482* | (2013.01) | |
| *G06F 3/0484* | (2022.01) | |

(56) References Cited

U.S. PATENT DOCUMENTS

| | | | |
|---|---|---|---|
| 5,767,854 | A | 6/1998 | Anwar |
| 5,870,734 | A | 2/1999 | Kao |
| 5,963,965 | A | 10/1999 | Vogel |
| 6,298,174 | B1 | 10/2001 | Lantrip et al. |
| 6,411,973 | B1 | 6/2002 | Yianilos |
| 7,433,885 | B2 | 10/2008 | Jones |
| 2001/0028369 | A1 | 10/2001 | Gallo et al. |
| 2003/0156146 | A1 | 8/2003 | Suomela et al. |
| 2005/0128212 | A1 | 6/2005 | Edecker et al. |
| 2006/0156228 | A1 | 7/2006 | Gallo et al. |
| 2006/0224998 | A1 | 10/2006 | Riss et al. |
| 2007/0188494 | A1 | 8/2007 | Agutter et al. |
| 2008/0079725 | A1 | 3/2008 | Sagalov |
| 2008/0235629 | A1 | 9/2008 | Porter et al. |
| 2008/0276201 | A1 | 11/2008 | Risch et al. |
| 2009/0046093 | A1* | 2/2009 | Kikuchi ............ G01C 21/3638 345/419 |
| 2009/0222717 | A1 | 3/2009 | Nelson |
| 2009/0089714 | A1 | 4/2009 | Blake et al. |
| 2011/0055713 | A1 | 3/2011 | Gruenewald et al. |
| 2012/0054687 | A1 | 3/2012 | Kawabata |

OTHER PUBLICATIONS

"STARLIGHT Information Visulaization Technologies," Introduction, Pacific Northwest National Laboratory, U.S. Department Energy, Richland, Washington, May 2002 (http://web.archive.org/web/20021013134034/http://starlight.pnl.gov/introduction.stm).

V.Parunak, "Windows Software for Bible Study," Journal of the Evanelical Theological Society, Vo. 46, No. 3, pp. 485-495, Sep. 2003 (available at http://www.cyber-chapel.org/reviews/Baseline.pdf).

J.S. Risch et al., "The Starlight Information Visualization System," IEEE Conference on Information Visualization (IV), 1997.

J. Wise et al., "Visualizing the Non-Visual—Spatial analysis and interaction with information from text documents," IEEE Proceedings of the Proceedings on Information Visalization (INFOVIS) 1995.

R. Feldman et al., "Trend Graphs—Visualizing the Evolution of Concept Relationships in Large Document Collections," Principles of Data Mining and Knowledge Discovery, vol. 1510, pp. 38-46, 1998.

* cited by examiner

FIG. 3

FIG. 4 word diamonds™   EXPLORE, MOVE AND CLICK!   Register | Log-in | Share   Words ⊙ Themes (Search)

Tilt: On ⊙ Off
Scriptures: On ⊙ Off
Reset Diamond ○

John 16:20
"Truly, truly, I say to you, that you will weep and lament, but the world will rejoice; you will be sorrowful, but your sorrow will be turned to joy."

Video

Diamond Subject
the revelation

Tags separated by commas

Private ○ Public  Save Diamond ⊕ to resize a scripture: hold down the shift key and drag with your mouse

About | Film | Contact | Legal | Terms of Service and Privacy Policy | Help

▷ Create Facets
My Diamonds
Random
Newest
Highest Rated

"Truly, truly, I say to you, that you will weep and lament, ..."

1 Facet    Add Facet ⊕ Remove Facet ⊖

106 — (Luke 12:40)
302
402

FIG. 5 word ⬨ diamonds™   EXPLORE, MOVE AND CLICK!    Register | Log-In | Share    Words ◯ Themes (Search)

Tilt: On ◯ Off
Scriptures: On ◯ Off
Reset Diamond ◯

Video

602

Luke 12:40
"You too, be ready; for the Son of Man is coming at an hour that you do not expect."

— 106

John 16:20
"Truly, truly, I say to you, that you will weep and lament, but the world will rejoice; you will be sorrowful, but your sorrow will be turned to joy."

— 302

○ "Truly, truly, I say to you, that you will weep and lament, …
○ "You too, be ready; for the Son of Man is coming at an…
○ — — —
○ — — —
○ — — —

402

1 Facet                          Add Facet ⊕ Remove Facet ⊖

Diamond Subject
the revelation

Tags separated by commas

Private ◯ Public   Save Diamond ⊕ to resize a scripture: hold down the shift key and drag with your mouse

About | Film | Contact | Legal | Terms of Service and Privacy Policy | Help

▸ Create Facets
My Diamonds
Random
Newest
Highest Rated

FIG. 7

FIG. 11 word◆diamonds™  EXPLORE, MOVE AND CLICK!    Register | Log-in | Share    [brother]    ⊙ 321 Results ⊗ Clear Results Tilt: On ⊙◯ Off
Scriptures: On ⊙◯ Off
Reset Diamond ◯

Acts 9:17
And Ananias departed and entered the house,
and after laying his hands on him said, "Brother
Saul, the Lord Jesus, who appeared to you on
the road by which you were coming, has sent me
so that you may regain your sight, and be filled
with the Holy Spirit."

1202

John 11:32
Therefore, when Mary came where Jesus was,
she saw Him, and fell at His feet, saying to Him,
"Lord, if You had been here, my brother would
not have died."

1206

Acts 12:2
And he had James the brother of John put
to death with a sword.

1204

11   1
12:2
3
4
5

Close Scripture ⊗

Video

1002 ──

▷ Create Facets
My Diamonds
Random
Newest
Highest Rated

402 ──

◯ Therefore, when Mary came where Jesus was, she saw Him,...
◯ And Ananias departed and entered the house, and after...
◯ And he had James the brother of John put to death with a...
◯ ◯ ◯

▽

1 Facet           Add Facet ⊕ Remove Facet ⊖

Diamond Subject
_____
the revelation
_____
_____
Tags separated by commas

Private ◯ Public  Save Diamond ⊕ to resize a scripture: hold down the shift key and drag with your mouse
About | Film | Contact | Legal | Terms of Service and Privacy Policy | Help

GRAPHICALLY REPRESENTING CONTENT RELATIONSHIPS ON A SURFACE OF GRAPHICAL OBJECT

CROSS REFERENCE TO RELATED APPLICATIONS

This application claims the benefit of priority under 35 U.S.C. § 119(e) to U.S. Provisional Application No. 61/102,663, filed on Oct. 3, 2008, the entire contents of which are incorporated by reference herein.

BACKGROUND OF THE INVENTION

Field of the Invention

The present invention generally relates to a method of organizing information, and more particularly to a method of organizing information to capture and graphically portray relationships among multiple pieces of information of various types.

Efforts in the field of information architecture have been, and continue to be, directed to finding methods to organize and access large amounts of information in a cohesive manner. Large groupings or collections of information often have interrelated pieces of information, which are not easily discoverable due to the size or complexity of the groupings or collections. In addition to the contents of the information itself, the relationships between portions of the information can also provide valuable insight into the groupings or collections.

SUMMARY OF THE INVENTION

A collection of content, such as a collection of text documents is associated with a graphical object, such as polyhedron having a plurality of surfaces. The text collection is divided into a number of portions. A portion can be a book, a chapter, a sub-chapter, a section, a sentence, or a term. Each portion is associated with a position on one of the surfaces of the graphical object; in one embodiment each portion is associated with a position identifier that maps the portion to a specific location on one of the surfaces of the object. A given surface can thus be associated with multiple portions of text, for example, the multiple sentences within a chapter, and each sentence would have a distinct position on the surface.

The graphical object can be displayed, and can be graphically manipulated, such as by rotation, tilt, and zoom operations, to display the various surfaces, and the text thereon. A user inputs selections of locations on the surfaces of the object. For each selected location, the text portion (e.g., term or sentence) indexed to that location is determined. Multiple location selections can be grouped together in a graphical arrangement displayed on the surfaces of the object. For example, a user selection of three different locations can be shown as connected by graphical elements, such as lines extending between selected locations to form a triangle, over or through the surfaces of the object. The graphical elements connecting the selected points can form a complex, irregular shape depending on the selected locations.

In one embodiment, a grouped selection of locations and their associated text portions is called a "facet." In this fashion, the user can more easily see the relationships between the selected portions of text by observing different facets that the user or others have created. In a typical use, a user may select multiple locations where the term "Truth" appears in the text, and form a "facet" linking these portions, thereby exposing an underlying semantic relationship between the otherwise unrelated portions of the text.

Multiple facets can be further selected and grouped together to form a more complex collection of related text; in one embodiment, a group of facets is called a "diamond." The user can select the text portions either directly by selecting specific locations on the surfaces of the object, or by searching for keywords or phrases in the text, which then are displayed at their respective locations. In one embodiment, facets and diamonds created by one or more users can be shared in a community of users. Facets and diamonds can be ranked according to frequency of access, popularity, or other measures of significance or importance.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 3 depicts a display screen showing the object of FIG. 1 together with a verse associated with identifying information of FIG. 2, in accordance with an aspect of the invention.

FIG. 4 depicts a display screen showing the object of FIG. 1 and the verse of FIG. 3 moved to another area of the display screen.

FIG. 5 depicts a display screen in which the verse of FIGS. 3 and 4 is added to a facet list and in which other identifying information is displayed.

FIG. 7 depicts a version of the display screen of FIG. 6 with the second verse added to the facet list.

FIG. 11 depicts a display screen showing the first verse of FIG. 10 added to a facet list and also showing other identifying information associated with at least a second verse.

FIG. 12 depicts a version of the display screen of FIG. 11 with second and third verses displayed and added to the facet list.

FIG. 13 depicts a display screen showing a verse and information about a portion of the verse.

DETAILED DESCRIPTION

Figure 1:
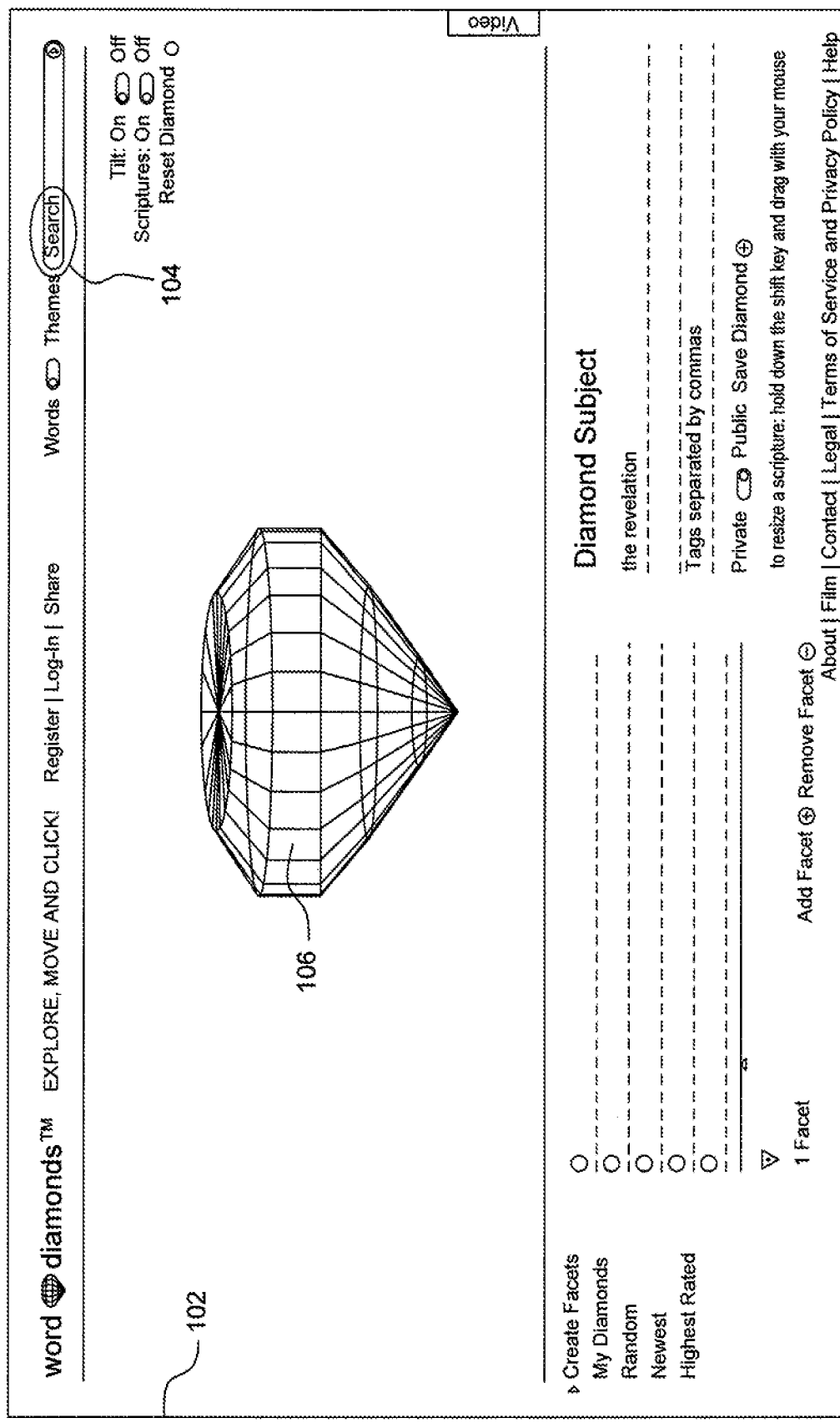
FIG. 1 depicts a display screen showing a rendering of a three-dimensional object, in accordance with an aspect of the invention.

In an aspect of the invention, a computer-implemented method of organizing and presenting a collection of data is provided. Examples of collections of data include encyclopedias, books, periodicals, speeches, libraries, films, musical recordings, etc.

The method includes providing the collection of data and associating a plurality of portions of the collection with corresponding position identifiers, each of which references a position on a surface of a graphical object. (In this disclosure, the terms "position" and "location" are used interchangeably.) The graphical object can be a regular Platonic object, having surfaces with uniform shape and size (e.g., cube, tetrahedron, octahedron, dodecahedron, icosahedron, or the like), or irregular polyhedron with surfaces of various shapes and sizes (e.g., diamond, geodesic, or the like).

The collection of data is preferably stored in a computer database, which can be accessed and searched via a programmed server computer. Such a server computer may be preferably connected to other computers in a conventional client/server relationship. Alternatively, the collection can be stored on a computer-readable storage medium that can be accessed by a client computer either locally or remotely, and need not be limited to client/server communication. Such a client computer can execute a computer program, which can access and process the stored information in accordance with various aspects and embodiments described herein. For example, in an embodiment, a client computer connected to a server via a network, such as the Internet, can be accessed by a user via an Internet web browser displayed on a client computer display device. The user can access the collection through a webpage viewable on the client computer display device. In addition, the user can input queries via the webpage and send them to the server via the client computer and the Internet. The server is configured to receive a user request, access the collection, execute the request, and send a reply containing results of the request to the client computer.

The method also includes receiving user selections of a plurality of portions of the collection. The two portions are discrete parts of the data of the collection, which has been divided into the plurality of portions. The collection may be divided into portions based upon existing content divisions, format, themes, publication information, or the like. For example, a book could be divided by its chapters and sub-chapters; an encyclopedia by its lettered sections or themes; a periodical publication by its volumes and issues; a technical manual by its topics, and forth. It should be noted that, in dividing the collection into portions, the portions can be, but need not necessarily be, of the same size. The method also includes comparing the identifiers associated with the first portion and the second portion, and graphically displaying a result of the comparison.

For example, the Bible is a large text with many discrete sections or books. These books may include chapters and verses relating to themes or terms such as "neighbor", "brother", and "father". Such terms or themes may be used in different contexts in the various portions of the Bible, and the ability to investigate the relationship(s) between such portions can produce a new theological insight when those portions are taken together. For instance, connected scripture passages may complement or contradict each other, or may show threads of thought common to both the Old and New Testaments of the Bible. However, because such phrases or themes may be spread out throughout the Bible, the connections to the various parts of the Bible may be difficult to identify, especially for readers who have not extensively studied the Bible. The reader is therefore limited in his or her ability to efficiently study the Bible.

In FIG. 1, a web page 102 is shown, in accordance with an example embodiment of the invention. The web page 102 includes a text-search field 104, which is used to input a text item to be searched in a collection (described below). Also, a graphical representation or rendering of a three-dimensional object 106 is shown. The object 106 may be a diamond with multiple faces, whose surfaces are associated with portions of the collection. In this example embodiment, the collection includes the text of the Bible, which is divided into portions (e.g., books, chapters, and verses). In one embodiment, the portions of the collection are indexed in a database as being associated with positions or other identifiers identifying the position of the portion on the surface of the diamond. For example, an inverted index may be used, where each term of the collection is mapped to a list of the portions of the collection in which the term appears (each portion identified by book, chapter, and verse), and a secondary index, which maps each portion to a position on the object. The position identifier can be in the form of an identifier of a specific surface of the object, and a location (absolute or relative) on that surface. For example, each surface can be assigned a unique numerical ID (e.g., 0 to N, where there are N surfaces on the object). The offset can be specified in (X,Y) coordinates relative to a given origin (e.g., vertex) of the surface, or as a relative percentage of distance between an origin vertex (e.g., upper left corner) and an ending vertex (e.g., bottom right corner) of the surface, or other equivalent formulations. As will be appreciated by persons skilled in the art, other database and indexing schemes may be used to associate different sets of data with each other.

The collection can be searched, either by entering a text item to search for a term or phrase, or by searching a surface of the object 106 using a pointer (e.g., cursor (not shown)) for locations on the surface that are associated with an identifier corresponding to that portion of the collection. Where a text search is performed, an input text search string is matched against the index to identify those portions of the text that correspond to the input text (the correspondence can be a literal Boolean string match, or a similarity match, or the like). The locations of the corresponding text portions on the surface of the diamond are determined. One or more of the matching portions are preferably shown graphically on the diamond, with the diamond being automatically oriented by rotation and tilt to show as many of the matching portions as possible. Of course, other portions of the object 106 in addition to its surfaces, such as its interior, can be used to index portions of the collection.

Figure 2:
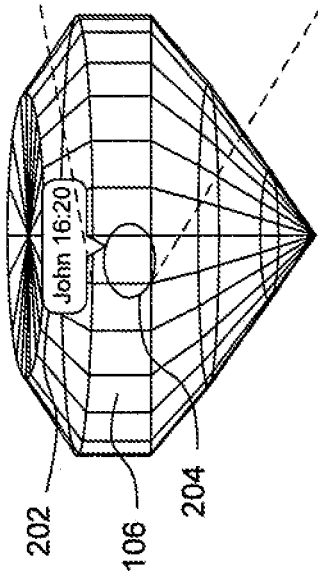
FIG. 2 depicts a display screen showing the object of FIG. 1 along with identifying information, in accordance with an aspect of the invention.

For instance, in the case of this example embodiment where the collection includes the text of the Bible, the positions on the surfaces of the object 106 can be searched for a specific verse associated with a portion of the Bible. Conversely, the portions of the Bible, such as verse or verses, can be associated with identifiers corresponding to a position on a multi-dimensional object other than a diamond, such as a polyhedron, for example. In one embodiment, each surface or face of the diamond is associated with a single book of the Bible and the location of the text within the respective book of the Bible linearly corresponds to the location of the text on the respective face of the diamond, reading from a top left corner to the bottom right corner. In an embodiment, with reference to FIG. 2, a face of the diamond 106, for example, is associated with the book of John and the location of the text within that book linearly corresponds to the location of the text on that face. As shown in FIG. 2, an exploded view of the face associated with the book of John shows the first verse of the first chapter (John 1:1) begins at the upper left of the surface, and is followed by John, chapter 1, verse 2 (John 1:2), and so on, to the right and down to chapter 21, verse 25 (John 21:25). By virtue of this arrangement, each face of the diamond completely organizes one book of the Bible and the various positions on the surface of that face are indexed to correspond to specific portions of the Bible. Each portion of the Bible can be further indexed to facilitate searching by terms, themes, titles, and keywords. For example, Genesis 1:1, may be a portion of the Bible which is associated with the upper left vertex of a face of the diamond 106, whereas Genesis 2:1 may be another portion of the Bible associated with another position of the same face of the diamond 106. Moreover, in another example, text within each indexed portion can be tagged, or otherwise associated with one or more of a term, theme, title, and keyword, such that a user can later search for the portion by inputting one or more of such fields. In the embodiment, the books of the Bible are graphically associated with circumferentially adjacent faces of the diamond so that they follow in a counterclockwise (or alternatively, clockwise) fashion around the diamond in the order they follow in the Bible (e.g., Genesis, Exodus, Leviticus, Numbers, Deuteronomy, etc.). The arrangement used here for indexing the Bible, dividing a text collection into a hierarchical arrangement of levels—such as books, chapters, and verses—can be applied to other text collections as well, such as encyclopedia, text books, instruction or technical manuals, and the like.

The object 106 is graphically displayed on a display device, such as a display screen of a client computer, a television monitor, a telephone screen, a personal digital assistant, and the like. Such a display device may be connected to an input device, such as, for example, a keyboard, a keypad, a mouse, a digital tablet, a digital pen, and the like, which can be communicatively connected in a known manner to a computer. Moreover, the display device may be a touchscreen display device that can receive manual input from a user via direct input on the display device. A viewer using the input device can position a pointer or other indicator over a position on the object 106 to reveal identifying information associated with that portion of the collection (i.e., the Bible in this example embodiment), such as, for example, the name of the book, the chapter, and the verse, as shown in FIG. 2. In an embodiment, the object 106 is rendered to appear in a three-dimensional environment using Flash® technology (Adobe Systems, Inc.) Flash® technology simulates a three-dimensional environment by using mathematical algorithms to animate two-dimensional objects onto a three-dimensional space. Thus, the object 106 may be rendered to appear as a rotating three-dimensional object via Flash® technology.

FIG. 2 shows a text box 202 that displays identifying information in front of the object 106. (In this sample embodiment the terms "object 106" and "diamond 106" are used interchangeably.) As discussed, with respect to the embodiment, the displayed text in the text box 202 is an indexed portion of the collection corresponding to the position of the surface of the object 106 that is being searched. For example, the text box 202 appears when the surfaces of the diamond 106 are graphically searched, such as when the aforementioned graphical pointer is positioned at or pointing to a location of the diamond 106. The text box 202 includes the identifying information associated with the specific position on the diamond 106 that is pointed to, which in the example embodiment corresponds to a verse of the Bible. Thus, as shown in FIG. 2, the location on the diamond 106 indicated by the text box 202 is associated with a certain verse of the Bible, namely, the book of John, at chapter 16, verse 20. In the example embodiment, each verse of a chapter of a book of the Bible is associated with a unique position on a surface 204 of the diamond 106. In one aspect of the example embodiment, each book of the Bible is associated with a single surface 204, such that all verses corresponding to that book are likewise associated with positions on that single surface 204. As shown in FIG. 2, a pointer can be positioned over a location on the diamond 106, in order to reveal the identification information in the text box 202 corresponding to that position of the diamond 106. The identification information in the text box 202 can be made to appear in response to the movement of the pointer at or over a certain position of the diamond 106. The diamond 106 can also be visually rotated or otherwise moved around by use of the pointer, such as, for example, using Flash® technology. Such movement of the diamond 106 permits the pointer to thereby traverse or search all surfaces of the diamond 106, including surfaces that otherwise would be obstructed by a particular viewing perspective.

Figure 3:
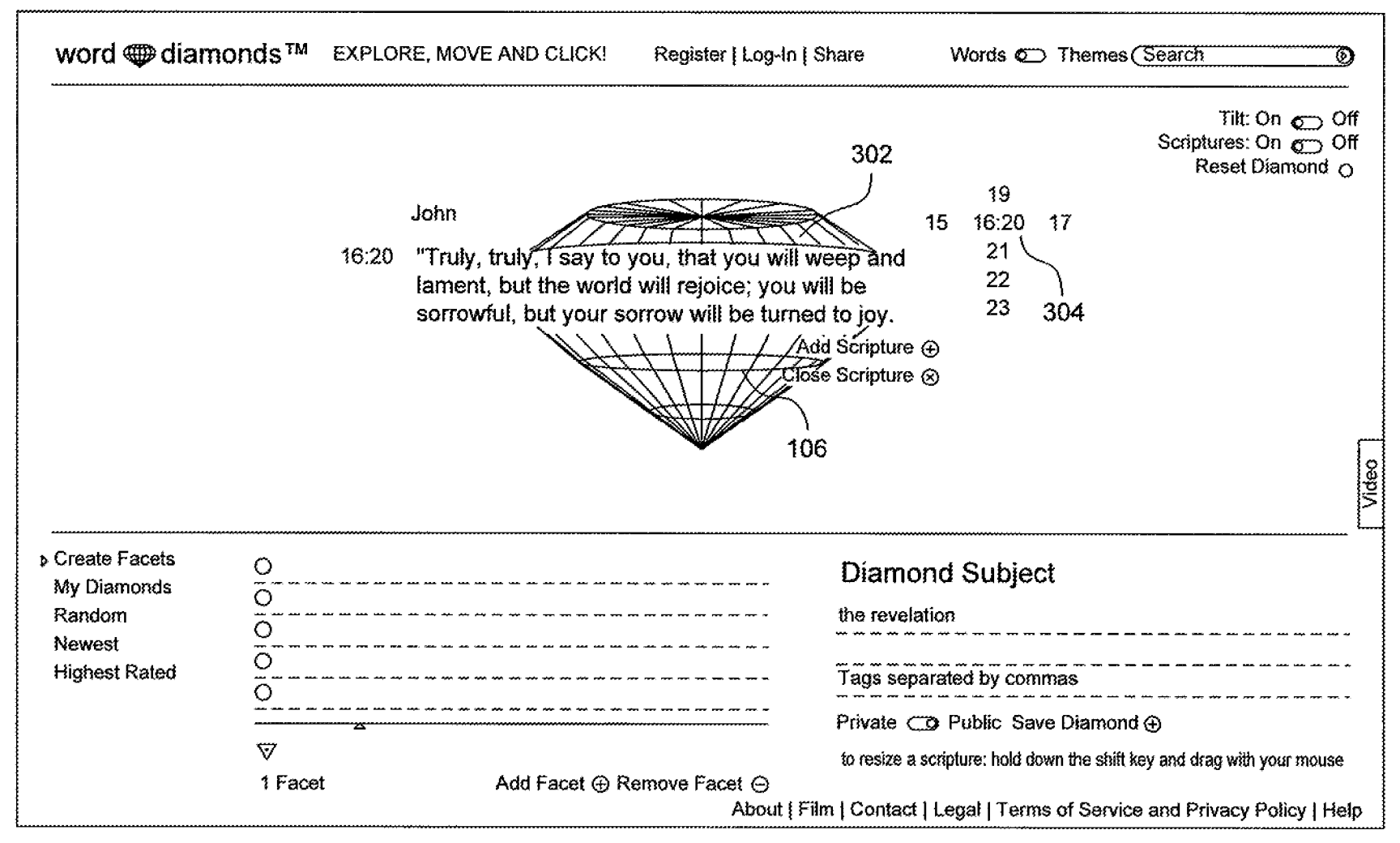

When a user wishes to view a particular passage of the Bible, the user can move the pointer over the diamond 106 to a desired verse, as indicated by the identifier information in the text box 202, and click or otherwise select that portion of the diamond 106 associated with that verse, to display the text of the verse 302, as shown in FIG. 3.

As shown in FIG. 3, in addition to the displayed text of the verse 302, scroll controls 304 are displayed adjacent to the displayed verse 302, and can be used to search for and display the text of verses preceding or following the originally selected verse 302 that are within the same chapter of the book of the Bible (e.g., scrolling from verse 16:20 to verse 16:19 or 16:21, etc.). Moreover, the scroll controls 304 also permit scrolling ahead and back by chapters in the same book of the Bible (e.g., scrolling from chapter 16 to chapter 15 or chapter 17).

Figure 4:
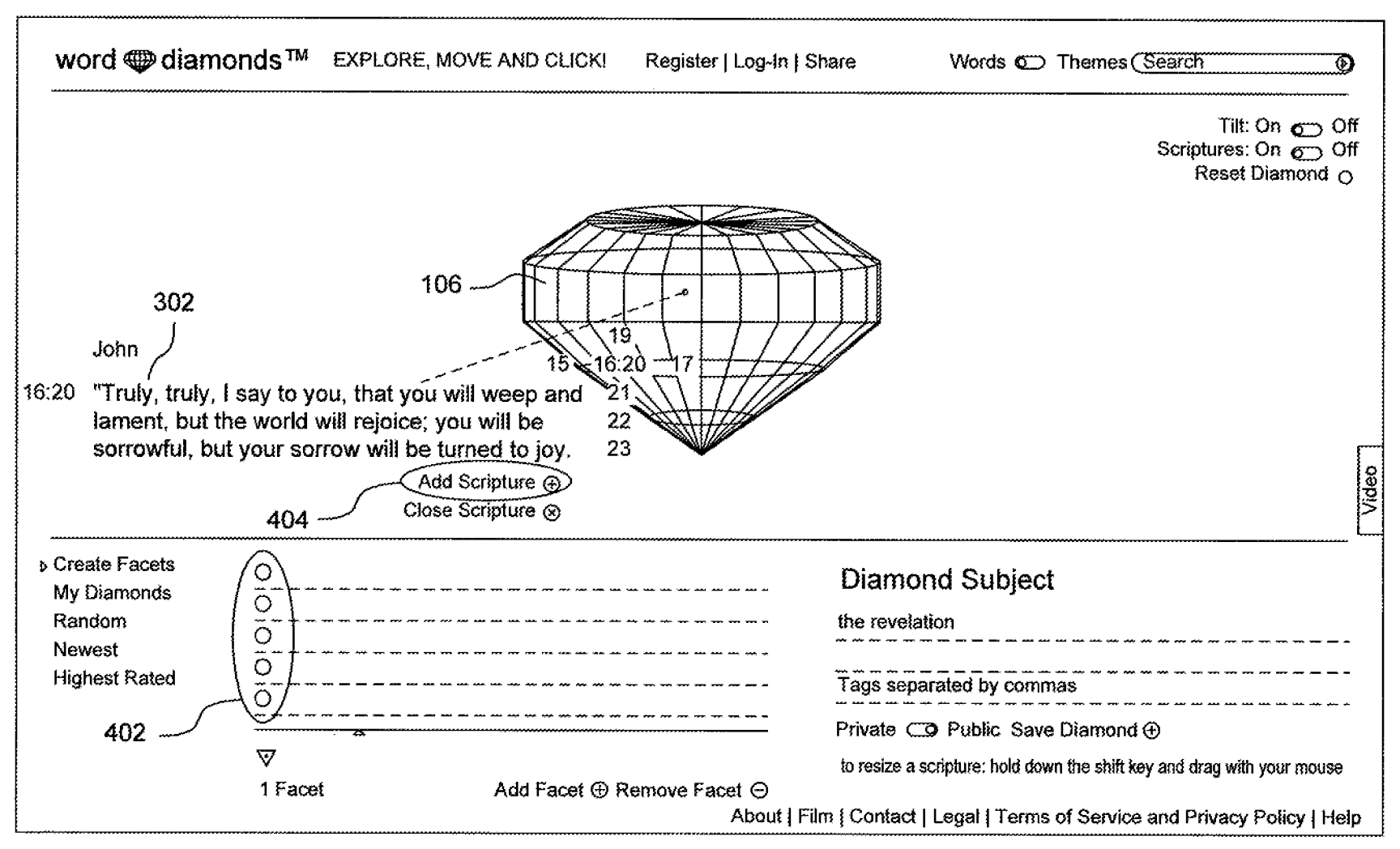

The displayed text of the verse 302 can graphically appear over or adjacent to the diamond 106. The text of the verse 302 can be translated and/or rotated within the web page using the input device (e.g., the computer mouse), as shown in FIG. 4 with respect to the position of the verse 302 in FIG. 3. In addition to being displayed for viewing, the text of the verse 302 can be added to a list 402 for later retrieval and viewing. In FIG. 4, while the text of the verse 302 is displayed, that text can be caused to be stored by a user. For example, a button marked "Add Scripture" 404 is selected to add the text of the verse 302 to the list 402 located in a field below the diamond 106, as shown in FIG. 5. The addition of the text of verses to the facet list 402 builds a group or set of verses referred to herein as a "facet" 804. As shown in FIG. 5, a facet can include up to 5 verses in the present sample embodiment, although in other embodiments the facet can include another number of verses. In the case of the list 402 shown in FIG. 4, additional facets can be created and also contain up to 5 verses in the present sample embodiment.

Figure 6:
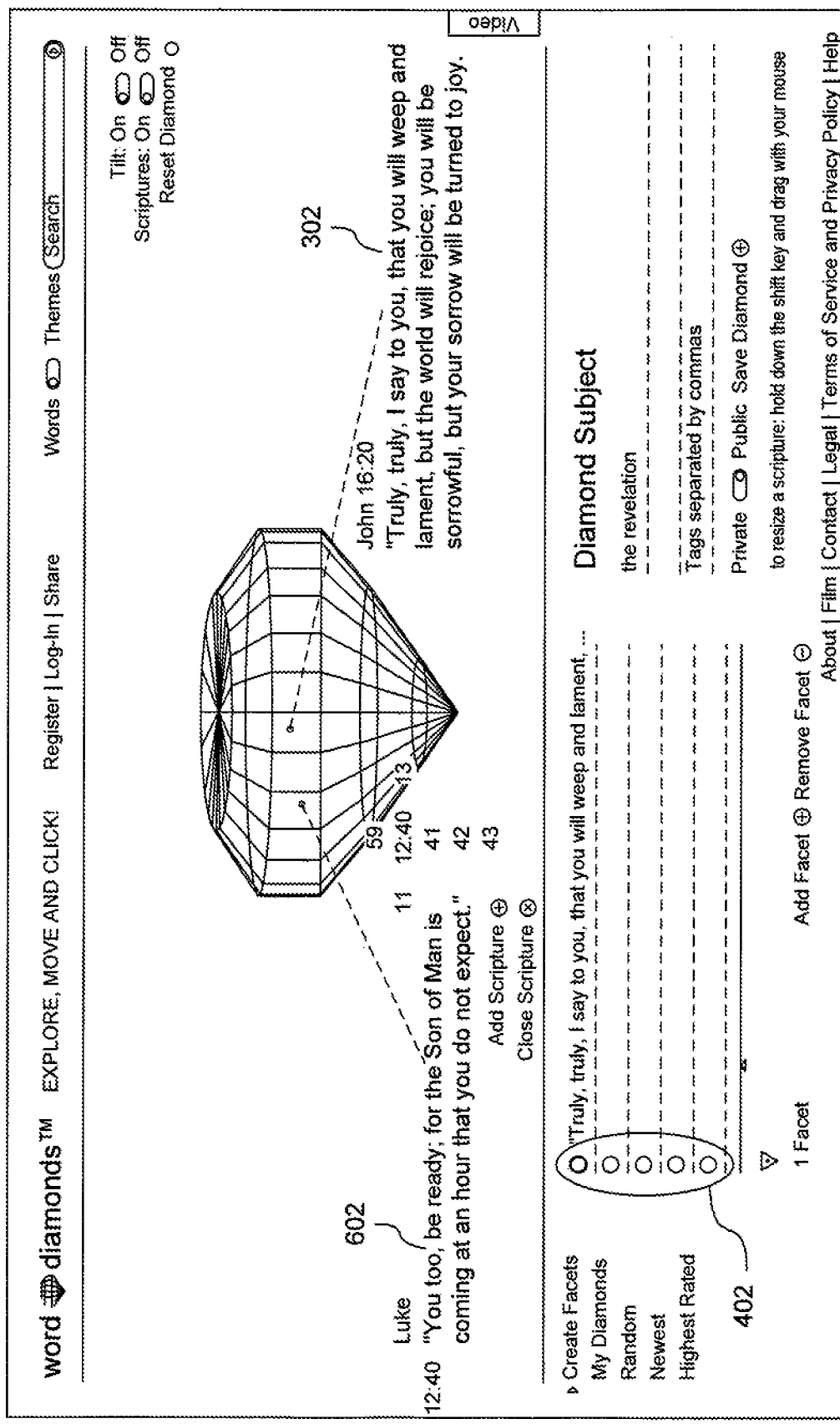
FIG. 6 depicts a version of the display screen of FIG. 5 with an additional second verse associated with the other identifying information.

As described above with respect to FIGS. 1-5, in FIG. 6 the text of a second verse 602 (e.g., Luke 12:40) is searched for and displayed. The text of the second verse 602 may be added to the list 402 (see FIG. 7) in the same manner as that of the text of the first verse 302.

Figure 8A:
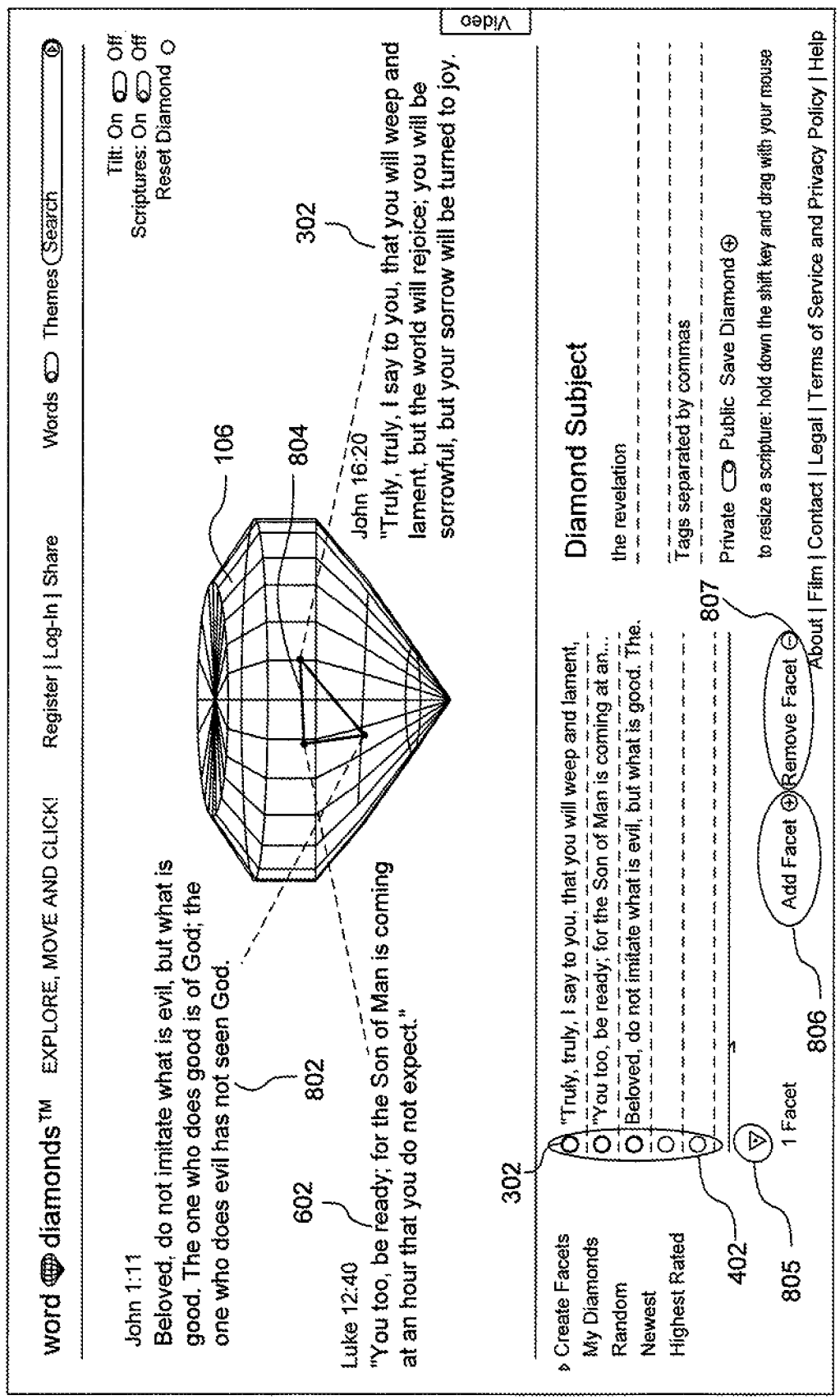
FIG. 8A depicts a version of the display screen of FIG. 7 with a third verse displayed and added to the facet list.

In FIG. 8A, the text of a third verse 802 (e.g., John 1:11) is shown displayed and added to the facet list 402 in like manner as with the first verse 302 and the second verse 602. FIG. 8A also shows a graphical depiction of a facet 804, as a relationship between the three verses 302, 602, and 802 listed on the facet list 402 and shown on the diamond 106. A facet 804 is represented by graphical elements, such as lines, connecting the locations on the diamond 106 associated with the three listed verses 302, 602, and 802. The facet 804 is formed when three or more verses are listed on a list 402, such that the lines connecting the locations on the diamond 106 form the facet 804.

The facet 804 is represented by a graphical indicator 805 positioned below the list 402. The graphical indicator 805 is preferably a polygon having a number of sides corresponding to the number of verses associated with the facet 804. The facet 804 is selected by selecting (e.g., pointing to) the graphical indicator 805. A dot positioned in the polygonal indicator 805 indicates that the facet 804 associated with the respective indicator 805 is selected. Therefore, as shown in FIG. 8A, the facet 804 is a facet associated with three verses and is represented by a triangle with a dot inside the triangle indicating that the facet 804 is selected. When the facet 804 is selected the verses associated with the facet 804 are displayed in the list 402 and the graphical depiction of the facet 804 is shown on the diamond 106.

Figure 8B:
FIG. 8B depicts a word diamond in the display screen on FIG. 1.

Another facet 808 can be added by selecting a button marked "Add facet" 806 (FIGS. 8A and 8B). In one embodiment, upon selecting the "Add facet" button 806 a triangular indicator 805 can initially be displayed below the list 402 with a dot in the triangular indicator 805 to indicate that the second facet 804 has been added and is selected. In one embodiment, the indicator 805 defaults initially to a three sided polygon because a facet graphically has a minimum of three linear sides. Also, upon selecting the button marked "Add facet" 806, the list 402 is reset and is blank. A user can select and add verses to the list 402 corresponding to the second face 804 in similar fashion to that described above with respect to the facet 804 associated with verses 302, 602, and 802. As shown in FIG. 8B, facet 808 is associated with four verses and is represented by a four sided polygon. The user can select among facets (e.g., 804, 808) by selecting (e.g., pointing to) the associated indicators 805.

As shown in FIG. 8B, a plurality of facets 804 can be grouped together to form a compilation hereinafter referred to as a "word diamond." (Although the term "word diamond" is used herein to refer to the compilation, the graphical representation of a "word diamond" need not be shaped as a diamond.) For example, in FIG. 8B, there are two graphical indicators, one triangular and one square, indicating that there are two facets, 804 and 808, associated with a total of seven verses. Also, shown graphically are facets 804 and 808 displayed with the diamond 806. Selecting the facet (e.g., 804 or 808) causes the respective facet to be highlighted on the diamond 106, such as, for example, by becoming brighter than the other facet(s) of the word diamond. Moreover, selecting the facet (e.g., 804 or 808) causes the display of the associated verses in the facet list 402, and causes the text of those verses to be displayed in the foreground on or around the diamond 106. Of course, in other embodiments, other numbers and combinations of verses and facets may be used and are within the scope of the invention; the specific numbers mentioned in the above embodiments are merely exemplary.

A verse (e.g., 302, 602, 802) in the list 402 can be removed by using the pointer to select a button or other control displayed. For example, indicators are shown in FIG. 8B as circles positioned to the left of the respective verses in the list 402. Removing the verse (e.g., 302, 602, 802) from the facet list 402 will also remove the verse 302 shown displayed with the diamond 106.

Furthermore, one or more facets (e.g., 804, 808) can be removed from the word diamond by selecting the facet, as described above, and subsequently selecting a button marked "Remove facet" 807. Removing the facet 804 will delete the list 402 associated with the facet 804 and will also delete the associated graphical indicator 805.

In creating a word diamond or searching for a previously created word diamond, a user can include further information in addition to the facet list, which may facilitate indexing and searching for the word diamond. For example, in one embodiment, the user can input a user-selected title of the word diamond, as well as keywords, phrases, or descriptive terms or tags that describe the contents of the facets or the theme of the word diamond. Such included text can be stored and indexed with the word diamond for searching and retrieval by the author or another user. For example, an author can create a word diamond whose theme is "family." In that example, the user can include the word "family" as a tag or keyword, which can be used as a search term for searching a collection of word diamonds.

Portions of the collection can also be searched using a word search. By searching for terms or words, instead of searching for a verse by graphically using the object or diamond 106, a user who is less knowledgeable about the location of a verse of the Bible, as represented by the diamond 106, can more efficiently search by inputting a term or word known to be included in the verse.

Figure 9:
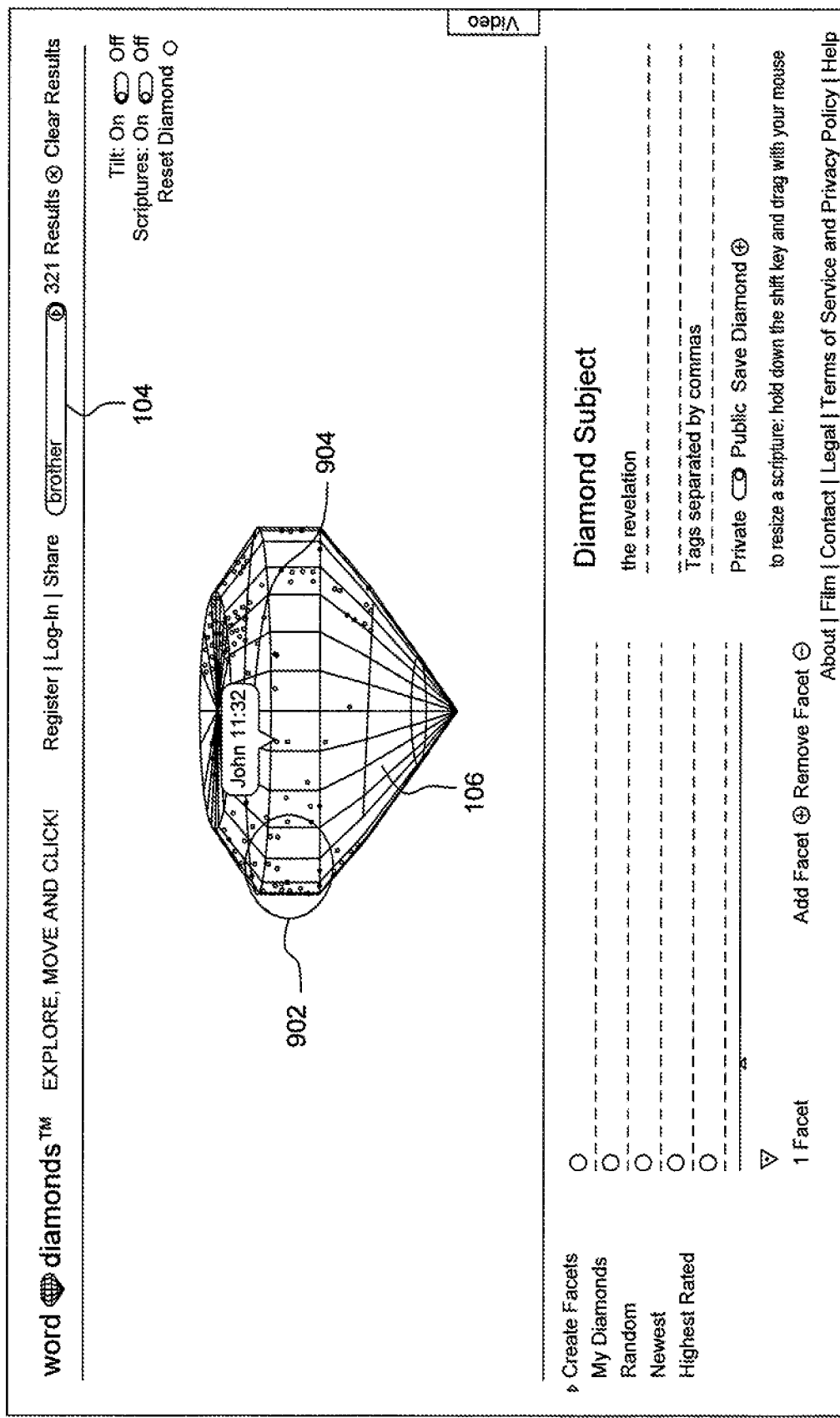
FIG. 9 depicts a display screen showing search results and identifying information for a search term, in accordance with an aspect of the invention.
Figure 10:
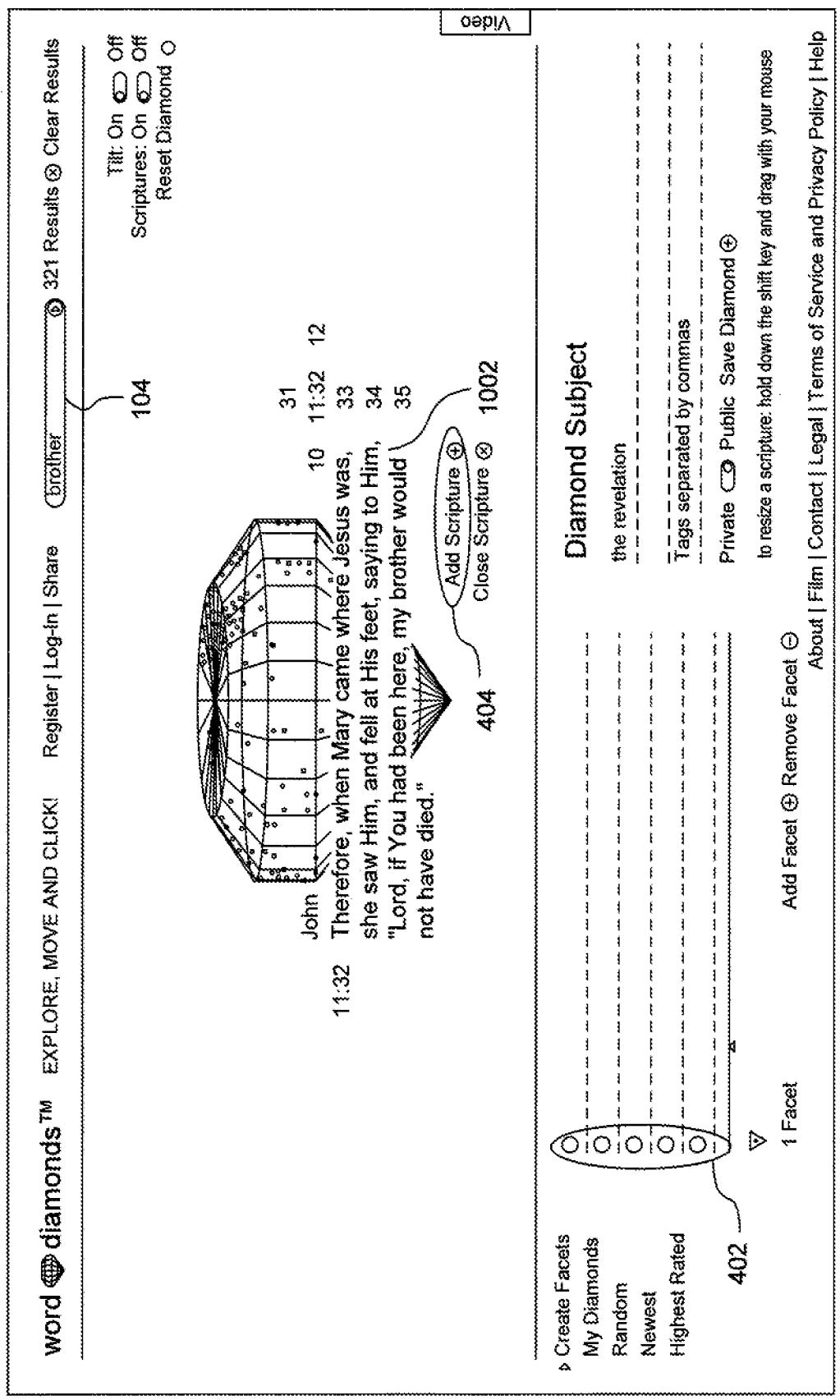
FIG. 10 depicts a version of the display screen of FIG. 9 with a first verse associated with the identifying information displayed in FIG. 9.
Figure 11:
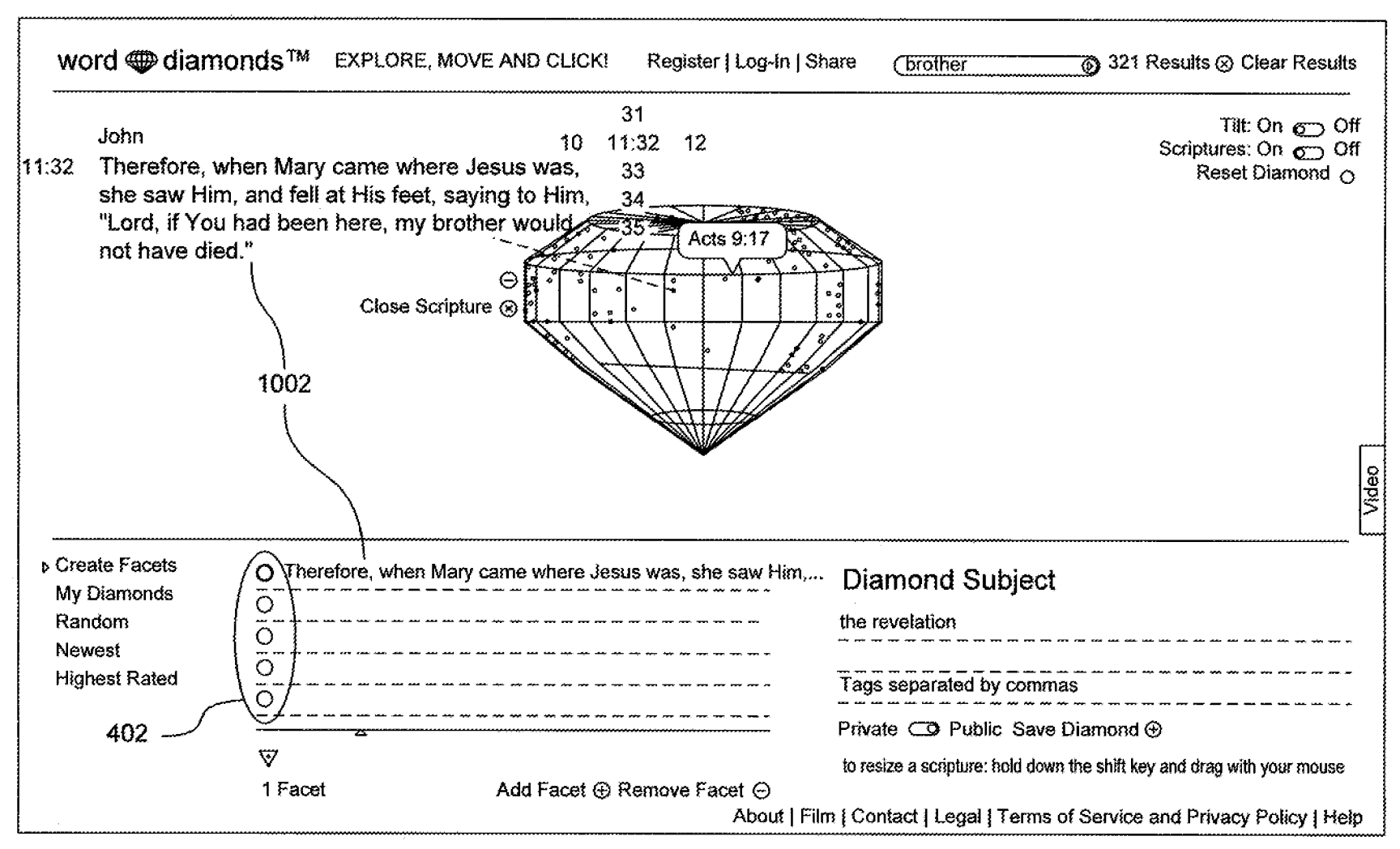

For example, as shown in FIG. 9, a search term "brother" is input into the search field 104 as a text item to be searched. The term can be input using an input device, including a keyboard, a keypad, a mouse, a touchscreen interface of the display device, and any combination thereof, and the like. The search can be for fields including terms, themes, titles, and keywords of a collection of text, such as verses of the Bible. As shown in FIG. 9 search results are shown as dots 902 on the surfaces of the diamond 106. The diamond 106 can be rotated around its horizontal and vertical axis to show dots 902 that may be obstructed due to the orientation of the diamond 106 currently displayed. In FIG. 9, each of the dots 902 represents a position on the diamond 106 associated with a corresponding verse of the Bible in which the term appears. Information about a specific verse can be displayed by moving a pointer, such as a mouse pointer, over the dot of interest, which causes the corresponding information to be displayed in a text box 904, similar to the text box 202 described above with respect to FIG. 2. Moreover, as discussed above with respect to the text box 202 and FIGS. 2 and 3, text of the verse 1002 associated with the information displayed in the text box 904 can, in like manner, be displayed by selecting the text box 904, as shown in FIG. 10. Further, as shown in FIG. 11, the verse 1002 can be added to the list 402 by selecting the "Add Scripture" button 404, as described above.

In FIG. 12, text of a second verse 1202 (e.g., Acts 9:17) and text of a third verse 1204 (e.g., Acts 12:2) are displayed, by selecting their respective dots 902 from the search results, and are added to the list 402 along with the first verse. As discussed earlier with respect to the facet 804 shown in FIG. 8, the relationship between the three verses 1002, 1202, and 1204 is shown by a triangular facet 1206, which is formed by connecting the locations on the diamond 106 associated with the respective verses. Facets and word diamonds can be created in a manner similar to that described above.

It should be noted that searching a collection using a word search and a graphical search of an object 106 associated with that collection can be used together, such as to construct the facets of a word diamond. For example, a user can begin to create a facet by first entering the search term "brother" in the search field 104, as shown in FIG. 9, and then selecting a verse from the search results and storing the verse in the list 402. Thereafter, a user can clear the search results from searching for the term "brother" and subsequently graphically search the diamond 106. A verse found from the graphical search may be saved in the list 402. Alternatively, successively different verses can be added to the list 402 as a result of successive text searches being entered and cleared. Such use of successive search terms may be useful when text that is displayed in verses are, in turn used as entered search terms for successive searches.

Figure 13:
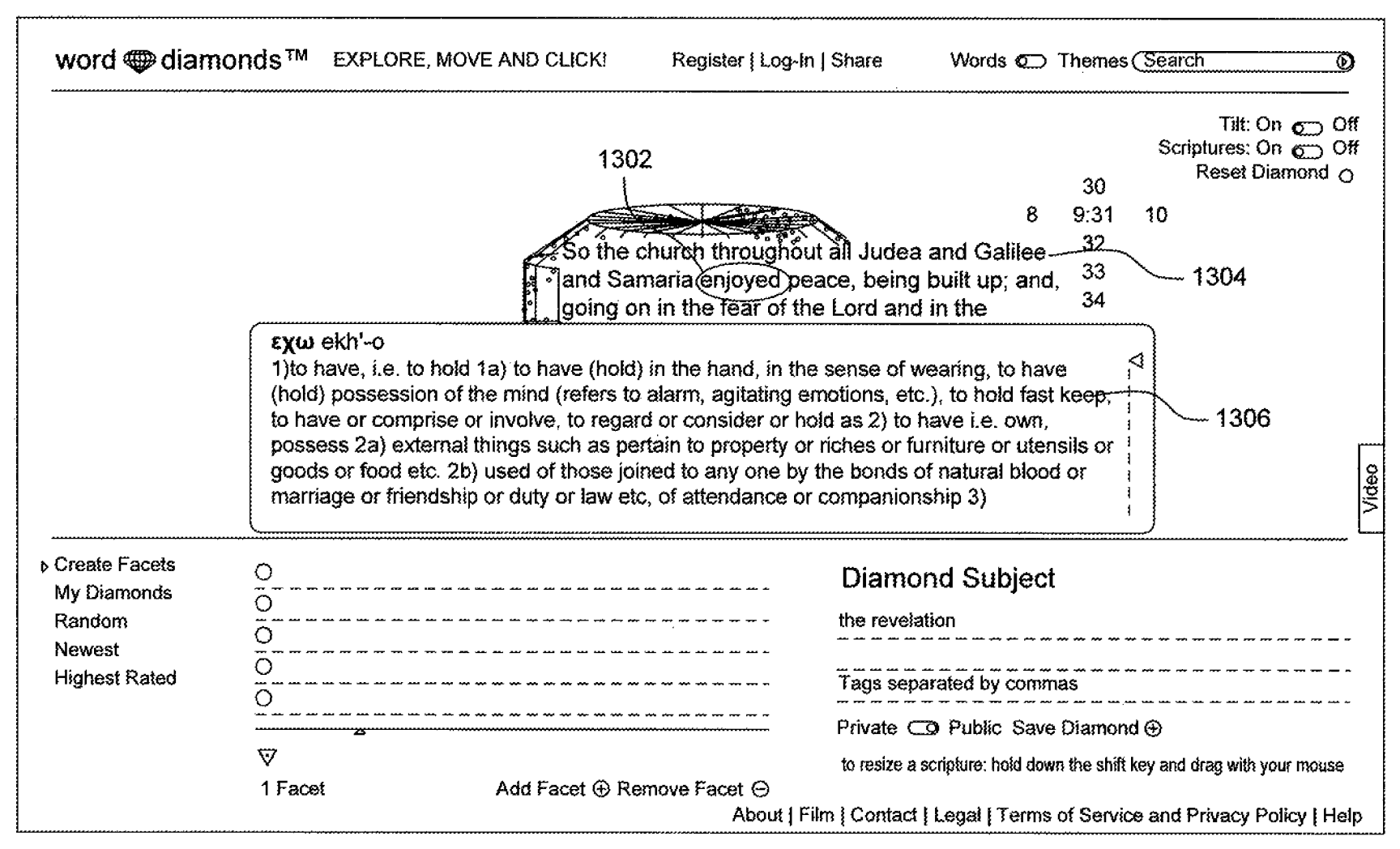

Moreover, in an embodiment shown in FIG. 13, at least one word 1302 within a displayed verse 1304 can be highlighted or otherwise selected using at least one of the aforementioned input devices to display further information related to the word 1302. For example, as shown in FIG. 13, the verse Acts 9:31 is displayed with the word "enjoyed" highlighted. A text box 1306 that includes a definition of the word "enjoyed" 1302, as well as the Greek spelling of that word and a phonetic pronunciation of that Greek spelling, is displayed for the highlighted (i.e., selected) word. Of course, in addition to a further display of a definition or a translation, in other embodiments, highlighting sub-portions (i.e. word 1302) of the displayed portion (i.e., verse 1304) can be used to generate an aural recitation of the sub-portion to the user, such as to provide a phonetic pronunciation, which can be transmitted to an audio device, such as a speaker. Moreover, in another embodiment, certain words of the verse can be selected to be used a search term for generating new search results.

Created word diamonds can be configured to be used as inputs to other applications. For example in one embodiment, data associated with the created word diamond can be stored for later retrieval of the word diamond in a same or in another computer program. Word diamond data can be used for example in a printing program to print or otherwise reproduce the word diamond on another media, such as paper, textile, or ceramic. In one case the word diamond data can be printed on a poster, an article of clothing, such as a shirt, or on a cup or mug.

In an embodiment, a user can create an account at the website in order to view and share word diamonds with other members of the website community. Moreover, the website may be configured to allow users of the website to import word diamond data and to upload that data to a storage location on a server.

Moreover, word diamonds created by users can be made visible or public to allow other users to view the facets and verses and to copy diamonds created by others. Such copied word diamonds can then be saved to a personal storage area on the website for later viewing and/or editing. Users of the website can select whether to make their word diamonds publicly viewable or make them privately viewable only by the author and/or selected parties. Users can also select and save as "favorites" word diamonds created by others as well as their own word diamonds for ease of later retrieval and viewing. The favorites may be saved as dynamic links to saved and indexed word diamonds.

The website may be configured to allow authenticated members to post publicly viewable comments and ratings for posted (i.e., publicly viewable) word diamonds. For example, members can rate the diamond on a numerical scale and can leave comments about the word diamond that can be viewed by other users viewing the word diamond.

Moreover, the website may be configured to track statistics on the number of times a word diamond is viewed, the age of the word diamond, the number of times a word diamond is copied and/or commented on, and the percentage of reviews at various numerical values on the numerical rating scale. The word diamonds can also be ranked based on the statistics compiled, such as ranking by user rating and by the number of views. Further, statistics may also be compiled about the author of the word diamond, such as the number of word diamonds created by the user. When viewing a word diamond, the viewer can also select, such as with a pointer, the author's name to view other word diamonds created by the author.

The website may also be configured to present a randomly generated selection of publicly available word diamonds. A user can then view one or more of the presented word diamonds as described above.

In another embodiment, co-occurrence information is maintained (e.g., in a co-occurrence matrix) to track which portions of the collection co-occur in facets and/or diamonds created by the users. Over time, the co-occurrence information can be used to identify which verses most frequently co-occur in facets/diamonds, and particularly co-occurrences that exceed an expected or average co-occurrence rate. Statistical analysis (e.g., information gain) can be used to identify naturally occurring facets that are hidden within the overall patterns of usage. For example, if verses A and B co-occur in facets significantly more frequently than expected, and verses B and C likewise co-occur in facets more frequently than expected, the system can identify a hidden facet or diamond in the grouping of verses A, B, and C, even if no user has created such a facet or diamond in fact. The identification of such hidden facets and diamonds may be used to reveal deep or fundamental relationships within the collection that may otherwise escape notice by users. In addition, vector models can be used to represent terms, verses, facets, and diamonds (using vector superposition) in the text collection. In this fashion, given a first facet or diamond, one or more similar facets or diamonds can be automatically identified using vector comparison operations (e.g., dot product).

The website may also be configured to permit a user to order, for purchase or for free, customized items, such as clothing and stationery that include the word diamond or variations of the word diamond. A secure checkout system for electronic commerce can be employed to process user orders and payment information.

Figure 14:
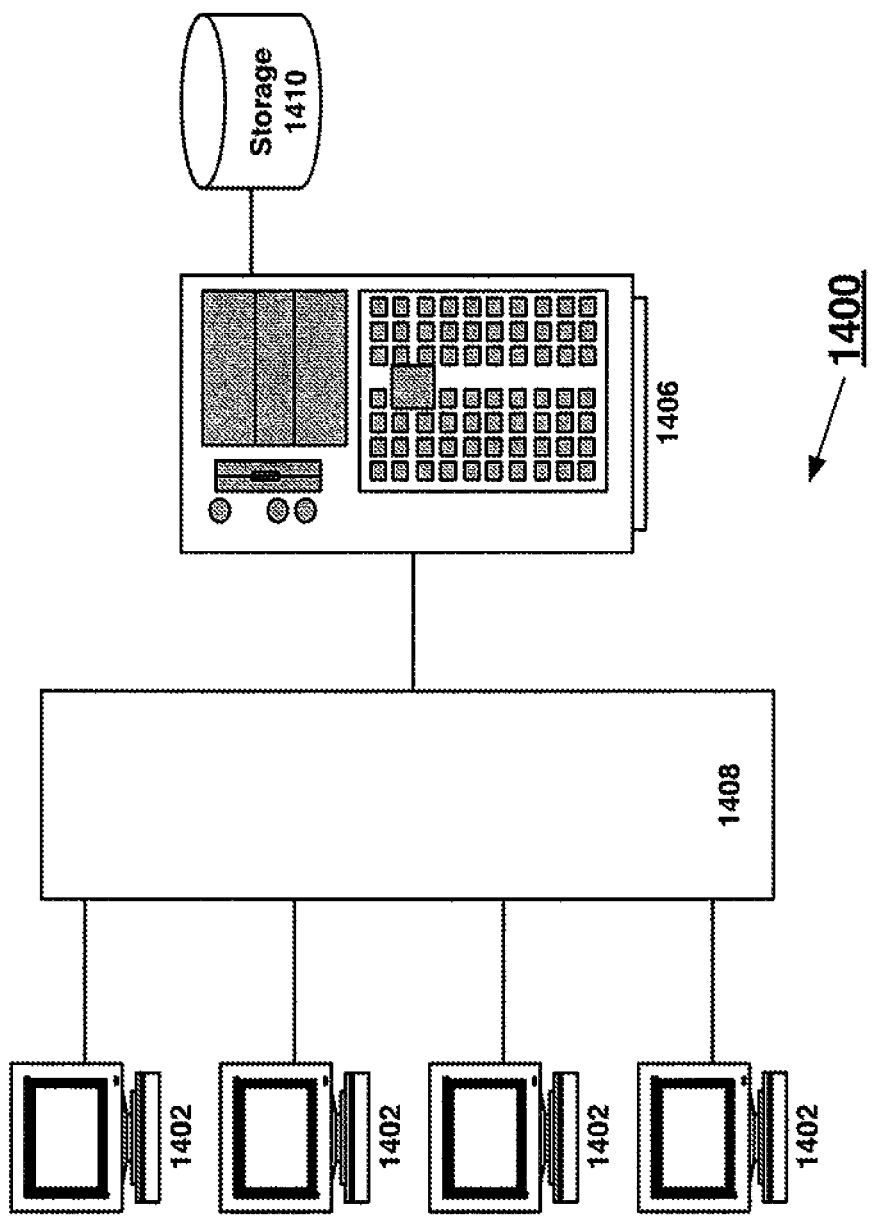
FIG. 14 depicts schematically an embodiment of an information organizing system in accordance with an aspect of the invention.

FIG. 14 schematically shows a system diagram of an exemplary information organizing system 1400, according to embodiments of the present invention. The system 1400 includes one or more user computers 1402 for enabling users to input and receive/view information, and an information coordinator 1406, all of which are connected to a communication network 1408. The information coordinator 1406 may be formed of a plurality of servers or a single server equipped with one or more processors (not shown) for processing communications to and from each of the user computers 1402 via the communication network 1408. The information coordinator 1406 includes a storage device 1410 storing a control program that is executable by the one or more processors.

The communication network 1408 may be the Internet, a dedicated or private communication network, a satellite communication network, or a combination thereof, or any other means of communication between the user computers 1402 and the information coordinator 1406.

Each of the user computers 1402 may include a personal computer, a workstation, or any other communication device that is able to transmit information to and receive information from the information coordinator 1406 via the communication network 1408.

The control program, when executed by the information coordinator 1406, provides a platform for implementing an interactive organization method. The control program contains computer-executable code for providing a user interface (e.g., a website) at which the user can create a word diamond based on a collection of information. The collection of information is preferably stored on the storage device 1410 along with a database which organizes indexes portions of the collection with at least one of a positional identifier associated with the object 106, such as, for example, a position on the surface of an object 106.

The control program may be written using a conventional computer programming language that is able to render a user interface for a website. Modules or routines of the computer program can be used to provide the functionality for performing each of the steps described above.

As schematically shown in FIG. 14, the user computers 1402 transmit the messages to the information coordinator 1406.

The systems and methods of the present invention (or any part(s) or function(s) thereof) may be implemented using hardware, software, or a combination thereof and may be implemented in one or more computer systems or other processing systems. Although some of the features of aspects of the present invention are described in terms that may be associated with mental operations performed by a human operator, no such capability of a human operator is necessary or is even desirable. Rather, such features are machine operations performed by machines such as computer processors or similar devices.

Figure 15:
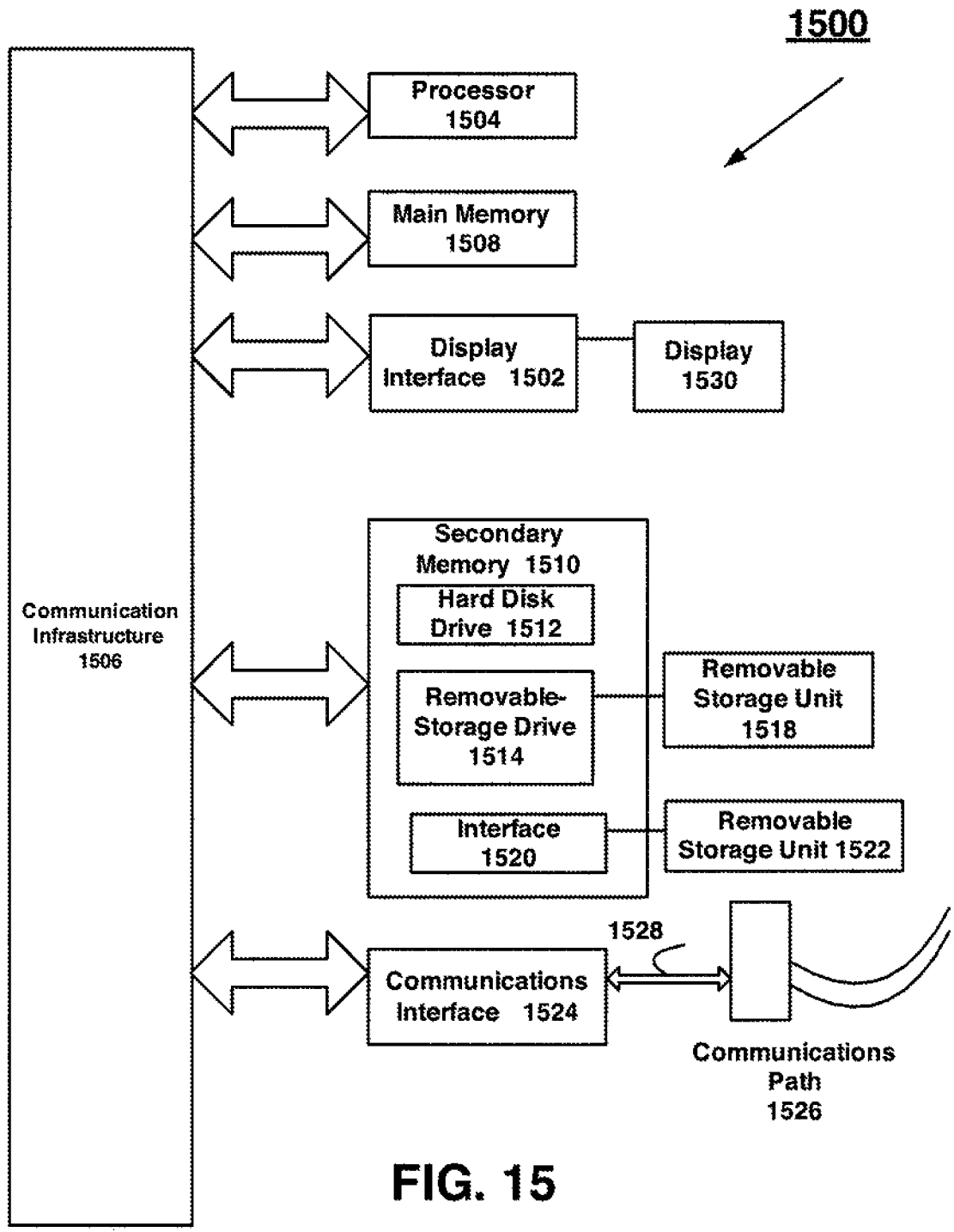
FIG. 15 depicts schematically an embodiment of a computer system in accordance with an aspect of the invention.

More specifically, embodiments of the present invention may be implemented by one or more computer systems configured or programmed to carry out the functionality described herein. An example of such a computer system 1500 is shown in FIG. 15. As will be appreciated by persons skilled in the art of computer operations, the computer system 1500 may utilize programming modules (not shown) for implementing various features and functions described herein.

The computer system 1500 may includes one or more processors, such as processor 1504. The processor 1504 is connected to a communication infrastructure 1506 (e.g., a communications bus, cross-over bar, or network). Various software embodiments are described in terms of this computer system 1500. However, after reading the descriptions provided herein, it will become apparent to a person skilled in the relevant art how to implement embodiments of the present invention using other computer systems and/or architectures.

The computer system 1500 may include a display interface 1502 that forwards graphics, text, and other data from the communication infrastructure 1506 (or from a frame buffer not shown) for display on a display unit 1530.

The computer system 1500 also may include a main memory 1508, preferably random access memory (RAM), and further may include a secondary memory 1510. The secondary memory 1510 may include, for example, a hard disk drive 1512 and/or a removable storage drive 1514, representing a floppy disk drive, a magnetic tape drive, an optical disk drive, a flash memory drive, etc. The removable storage drive 1514 reads from and/or writes to a removable storage unit 1518 in a well known manner. As will be appreciated, the removable storage unit 1518 includes a computer-readable storage medium storing computer software (i.e., program code) and/or data.

In alternative embodiments, the secondary memory 1510 may include other similar devices for allowing computer programs or other instructions to be loaded into the computer system 1500. Such devices may include, for example, a removable storage unit 1522 and an interface 1520. Examples of such may include a program cartridge and a cartridge interface (such as that found in video game devices), a removable memory chip (such as an erasable programmable read only memory (EPROM) or a programmable read only memory (PROM)), and an associated socket, as well as other removable storage units 1522 and other interfaces 1520 that allow software and data to be transferred from the removable storage unit 1522 to the computer system 1500.

The computer system 1500 also may include a communications interface 1524, which allows software and data to be transferred between the computer system 1500 and external devices. The communications interface 1524 may be, for example, a modem, a network interface (such as an Ethernet card), a communications port, a Personal Computer Memory Card International Association (PCMCIA) slot and card, and the like. Software and data transferred via communications interface 1524 are in the form of signals 1528 which may be electronic, electromagnetic, optical, or other types of signals capable of being received by communications interface 1524. These signals 1528 are provided to the communications interface 1524 via a communications path (e.g., a channel) 1526. The path or channel 1526 carries the signals 1528 and may be implemented using an one or a combination of: wire and/or cable; fiber optics; a telephone line; a cellular link; a radio frequency (RF) link; and other types of communications channels or paths.

The term "computer-readable medium" and similar such terms as used herein are intended to refer generally to a tangible storage medium, such as the removable storage drive 1514, a hard disk installed in hard disk drive 1512, a flash-type memory unit, and the like.

The computer programs (also referred to herein as computer control logic and computer code) may be stored in the main memory 1508 and/or the secondary memory 1510. The computer programs also may be received via the communications interface 1524. Such computer programs, when executed, enable the computer system 1500 to perform the features and functions of various embodiments of the present invention, as discussed herein. In particular, the computer programs, when executed, enable the processor 1504 to perform or implement the features and functions of various embodiments of the present invention. Accordingly, such computer programs may be considered to represent controllers of the computer system 1500.

In an embodiment where the present invention is implemented using software, the software may be stored in a computer program product (e.g., a computer-readable storage medium) and loaded into the computer system 1500 using removable storage drive 1514, the hard drive 1512, or the communications interface 1524. The control logic (software), when executed by the processor 1504, causes the processor 1504 to implement various functions described herein.

In another embodiment, the present invention may be implemented primarily in hardware using, for example, hardware components such as application specific integrated circuits (ASICs). Implementation of such a hardware-based machine so as to implement various ones of the functions described herein will be apparent to persons skilled in the relevant arts and, as such, is not described in detail herein.

In yet another embodiment, the present invention may be implemented using a combination of both hardware and software.

While various embodiments of the present invention have been described above, it should be understood that they have been presented by way of example, and not limitation. It will be apparent to persons skilled in the relevant art(s) that various changes in form and detail can be made to the described embodiments without departing from the spirit and scope of the present invention. Thus, the present invention should not be limited by any of the above described exemplary embodiments, but should be defined only in accordance with the following claims and their equivalents.

In addition, it should be understood that the figures illustrated in the attached drawings, which show operations and functions of embodiments of the present invention, are presented schematically for example purposes only. The architectures of embodiments of the present invention are sufficiently flexible and configurable such that they may be utilized (and navigated) in ways other than those shown in the figures.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the specification. The Abstract is not intended to be limiting as to the scope of the present invention in any way.

Additionally, it is to be understood that the steps and processes recited in the claims need not be performed in the order presented.

What is claimed is:

1. A computer-implemented method of presenting a collection of data, the method being performed by a computer that includes a central processing unit coupled to a memory storing a program for implementing the method when executed by the central processing unit, the method comprising:
    storing a collection of structured text data in a computer database, the collection having a plurality of indexed portions, each indexed portion associated with a position on a surface of a rendered three-dimensional object, wherein the portions are divided at least based upon predetermined content divisions;
    displaying the three-dimensional object and a text-search field area on a display device;
    receiving at least one search term inputted by a user in the text-search field area;
    determining at least one of the plurality of indexed portions that corresponds to the at least one search term;
    determining at least one position on the surface of the displayed three-dimensional object that is associated with the at least one of the plurality of indexed portions; and
    providing a visual indicator to the determined at least one position of the surface of the displayed three-dimensional object.

2. The computer-implemented method according to claim 1, further comprising: determining a plurality of positions on the surface of the displayed three-dimensional object that are associated with selected portions of data, with one of the plurality of positions being the determined at least one position on the surface of the displayed three-dimensional object that is associated with the at least one of the plurality of indexed portions; and displaying on the object linear segments that extend between each of the plurality of positions.

3. The computer-implemented method of claim 1, wherein the collection corresponds to one of:
    a collection of Bible-related data,
    a collection of music-related data,
    a collection of film-related text data,
    a collection of speech-related text data,
    a collection of encyclopedia-related text data,
    a collection of periodical-related text data, and
    a collection of book-related data.

4. The computer-implemented method of claim 1, wherein the displayed three-dimensional object is a polyhedron, and
    wherein the surface of the polyhedron is divided into a plurality of areas, with each area corresponding to one of the plurality of indexed portions.

5. A non-transitory computer readable storage medium storing computer code that, when executed by a central processing unit of a computer, causes the central processing unit to perform a method for graphically presenting a collection of data, the method comprising the steps of:
    accessing a collection of structured text data in a computer database, the collection having a plurality of indexed portions, each indexed portion associated with a position on a surface of a rendered three-dimensional object, wherein the portions are divided at least based upon predetermined content divisions;
    displaying the three-dimensional object and a text-search field area on a display device;
    receiving at least one search term inputted by a user in the text-search field;
    determining at least one of the plurality of indexed portions corresponding to the at least one search term;
    determining at least one position on the surface of the displayed three-dimensional object that is associated with the at least one of the plurality of indexed portions; and
    providing a visual indicator to the determined at least one position of the surface of the displayed three-dimensional object.

6. The non-transitory computer readable storage medium according to claim 5, wherein the method further comprises steps of:
    determining a plurality of positions on the surface of the displayed three-dimensional object that are associated with selected portions of data, with one of the plurality of positions being the determined at least one position on the surface of the displayed three-dimensional object that is associated with the at least one of the plurality of indexed portions; and
    displaying on the object linear segments that extend between each of the plurality of positions.

7. The non-transitory computer readable storage medium according to claim 5, wherein the collection corresponds to one of:
    a collection of Bible-related data,
    a collection of music-related data,
    a collection of film-related text data, a collection of speech-related text data,
a collection of encyclopedia-related text data,
a collection of periodical-related text data, and
a collection of book-related data.

8. The non-transitory computer readable storage medium according to claim 5, wherein the displayed three-dimensional object is a polyhedron, and wherein the surface of the polyhedron is divided into a plurality of areas, with each area corresponding to one of the indexed portions.

* * * * *